(12) United States Patent
Miyauchi

(10) Patent No.: US 11,743,597 B2
(45) Date of Patent: Aug. 29, 2023

(54) ELECTRONIC APPARATUS AND CONTROL METHOD THEREOF, AND STORAGE MEDIUM

(71) Applicant: CANON KABUSHIKI KAISHA, Tokyo (JP)

(72) Inventor: Satoshi Miyauchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/727,611

(22) Filed: Apr. 22, 2022

(65) Prior Publication Data

US 2022/0353406 A1  Nov. 3, 2022

(30) Foreign Application Priority Data

Apr. 28, 2021  (JP) .................................. 2021-076560

(51) Int. Cl.
*H04N 23/745* (2023.01)
*H04N 23/73* (2023.01)

(52) U.S. Cl.
CPC .......... *H04N 23/745* (2023.01); *H04N 23/73* (2023.01)

(58) Field of Classification Search
CPC . H04N 5/2357; H04N 5/2353; H04N 5/23245
See application file for complete search history.

(56) References Cited

U.S. PATENT DOCUMENTS

| 10,868,972 B2 | 12/2020 | Sugawara |
| 2014/0333799 A1* | 11/2014 | Nakagawara ........ H04N 23/745 348/228.1 |
| 2016/0006919 A1* | 1/2016 | Aoyama ................ H04N 23/73 348/226.1 |
| 2017/0041522 A1* | 2/2017 | Nakagawara .......... H04N 23/80 |
| 2019/0373160 A1 | 12/2019 | Sugawara |

FOREIGN PATENT DOCUMENTS

JP        2019212989 A    12/2019

* cited by examiner

*Primary Examiner* — Twyler L Haskins
*Assistant Examiner* — Angel L Garces-Rivera
(74) *Attorney, Agent, or Firm* — CANON U.S.A., INC. IP Division

(57) ABSTRACT

An apparatus comprises: a sensor; a controller that controls the sensor so as to obtain images by repeatedly capturing an image of a subject, and to output a detection signal for detecting flicker during a period since capturing of an Nth image is performed to capturing of an N+1th image is performed; a calculation unit that calculates information relating to flicker based on the detection signal; a selector that selects Nth information calculated based on the detection signal or N−1th information calculated immediately before the Nth information according to a predetermined condition relating to a period required for performing calculation based on the detection signal; and a determination unit that determines a capturing timing of the N+1th image based on the Nth information or the selected N−1th information.

20 Claims, 6 Drawing Sheets

ELECTRONIC APPARATUS AND CONTROL METHOD THEREOF, AND STORAGE MEDIUM

BACKGROUND

Field

The aspect of the embodiments relates to an electronic apparatus and a control method thereof, and a storage medium, and more particularly to a technique for reducing the influence of flicker when capturing an image.

Description of the Related Art

Recently, in image capturing apparatuses, such as digital cameras, the sensitivity of the image sensor has been increased, and it has become possible to perform image capturing with a high-speed shutter, such as $1/4000$ seconds or $1/8000$ seconds.

When such a high-speed shutter is used to capture a plurality of images in the continuous image capturing mode or when a moving image is shot under an artificial light source (hereinafter referred to as "flicker light source") in which the amount of light changes, the exposure varies between frame images due to blinking of the light from the flicker light source. Further, when the change in the amount of light during charge accumulation is large, the exposure nonuniformity remarkably appears in the vertical direction of the image of one frame. Further, even in the case of capturing one still image, exposure nonuniformity may appear or an image with a desired brightness may not be obtained depending on the charge accumulation timing.

To solve such issues, there is known a method of reducing the influence of flicker by detecting flicker and performing exposure at the peak timing at which the amount of light of flicker peaks, where the change in brightness of the light source is the smallest.

The frequency of flicker is twice the frequency of the commercial power supply, so it is either 100 Hz or 120 Hz. Therefore, in order to perform exposure at the peak timing of flicker, the fundamental frequency (100 Hz or 120 Hz) of flicker and the peak timing are detected in advance, and the exposure is performed in synchronization with the peak timing of the flicker.

On the other hand, it is known that the frequency of the commercial power supply in Japan has a fluctuation in the range of about ±0.3 Hz with respect to the fundamental frequency of 50 Hz or 60 Hz. Since the frequency of flicker is twice the frequency of the commercial power supply, the frequency of flicker of the light source is 100±0.6 Hz or 120±0.6 Hz. Therefore, if the peak timing detection operation is not performed periodically, the deviation of the detected peak timing from the actual peak timing will gradually increase and the influence of flicker may not be reduced.

It is possible to control the capturing timing so as not to deviate from the peak timing of the flicker by performing the peak timing detection operation between the frames of continuous image capturing or moving image capturing. However, in order to detect the peak timing of the flicker, processing for the detection is to be performed, so that the frequency of the continuous image capturing may be lowered.

As a countermeasure for this issue in Japanese Patent Laid-Open No. 2019-212989, a flicker frequency is detected with high accuracy before the start of continuous image capturing and the flicker detection process between frames in continuous image capturing is omitted, thereby performing the continuous image capturing at high frequency while reducing the influence of flicker. Then, until a certain time elapses since the flicker frequency was detected, it is assumed that the difference between the actual flicker frequency and the detected flicker frequency is small and the exposure nonuniformity is within required accuracy, and the flicker detection process between frames of the continuous image capturing is omitted.

However, in the prior art disclosed in Japanese Patent Laid-Open No. 2019-212989, when a certain period of time or more has passed since the time when flicker was detected, it is assumed that the exposure nonuniformity does not fall within the required accuracy, and flicker detection process is performed between frames of the continuous image capturing, which causes the frequency of the continuous image capturing to be changed to a lower frequency. Therefore, there is an issue that the frequency of the continuous image capturing becomes low Further, since the frequency of the continuous image capturing switches between high and low every time a certain period of time or more elapses, there is an issue that the continuous image capturing cannot be performed stably at high frequency.

SUMMARY

According to the aspect of the embodiments, provided is an apparatus comprising: at least one processor; and a memory coupled to the at least one processor, the memory having instructions that, when executed by the processor, performs operations as: a sensor that captures an image; a controller that controls the sensor so as to obtain images by repeatedly capturing an image of a subject, and to output a detection signal for detecting flicker during a period since capturing of an Nth image (N is a natural number) is performed to capturing of an N+1th image is performed; a calculation unit that calculates information relating to flicker based on the detection signal; a selector that selects Nth information calculated based on the detection signal output during the period since the capturing of the Nth image is performed to the capturing of the N+1th image is performed or N−1th information calculated immediately before the Nth information according to a predetermined condition relating to a period required for performing calculation based on the detection signal; and a determination unit that determines a capturing timing of the N+1th image based on the Nth information or the selected N−1th information.

Further, according to the aspect of the embodiments, provided is a method for controlling an apparatus comprising: controlling a sensor so as to obtain images by repeatedly capturing an image of a subject, and to output a detection signal for detecting flicker during a period since capturing of an Nth image (N is a natural number) is performed to capturing of an N+1th image is performed; calculating information relating to flicker based on the detection signal; selecting Nth information calculated based on the detection signal output during the period since the capturing of the Nth image is performed to the capturing of the N+1th image is performed or N−1th information calculated immediately before the Nth information according to a predetermined condition relating to a period required for performing calculation based on the detection signal; and determining a capturing timing of the N+1th image based on the selected one of the Nth information or the N−1th information.

Furthermore, according to the aspect of the embodiments, provided is a non-transitory computer-readable storage medium, the storage medium storing a program that is executable by the computer, wherein the program includes program code for causing the computer to operate as an apparatus having a sensor that captures an image comprising: a controller that controls the sensor so as to obtain images by repeatedly capturing an image of a subject, and to output a detection signal for detecting flicker during a period since capturing of an Nth image (N is a natural number) is performed to capturing of an N+1th image is performed; a calculation unit that calculates information relating to flicker based on the detection signal; a selector that selects Nth information calculated based on the detection signal output during the period since the capturing of the Nth image is performed to the capturing of the N+1th image is performed or N−1th information calculated immediately before the Nth information according to a predetermined condition relating to a period required for performing calculation based on the detection signal; and a determination unit that determines a capturing timing of the N+1th image based on the Nth information or the selected N−1th information.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

DESCRIPTION OF THE EMBODIMENTS

Figure 1:
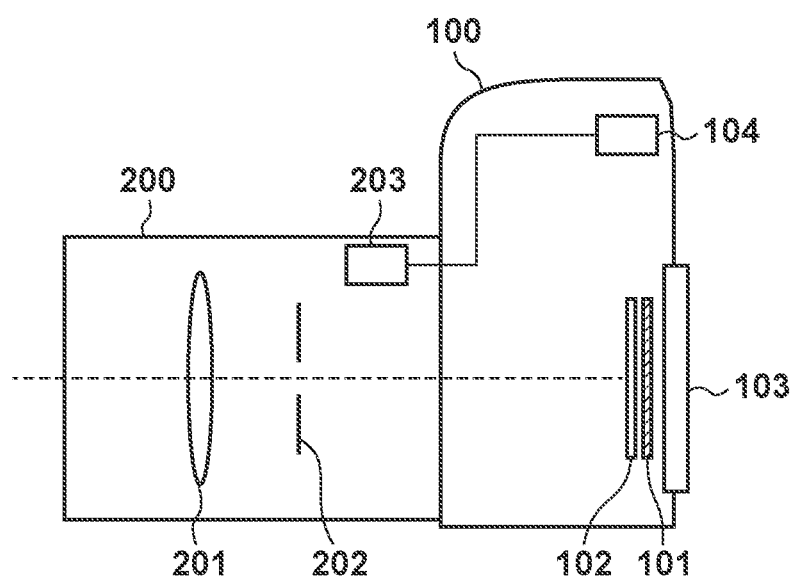
FIG. 1 is a diagram showing a schematic configuration of a digital mirrorless camera according to an embodiment of the disclosure.

Hereinafter, embodiments will be described in detail with reference to the attached drawings. Note, the following embodiments are not intended to limit the scope of the disclosure, and limitation is not made a disclosure that requires a combination of all features described in the embodiments. Two or more of the multiple features described in the embodiments may be combined as appropriate. Furthermore, the same reference numerals are given to the same or similar configurations, and redundant description thereof is omitted.

In this embodiment, a digital mirrorless camera will be described as an example. However, the aspect of the embodiments can be applied to various electronic devices as long as they have a live view image display function and a moving image capturing function, and can be applied to, for example, smartphones, camcorders, game machines with cameras, and the like.

First Embodiment

FIG. 1 is a diagram showing a schematic configuration of a digital mirrorless camera according to the present embodiment, and mainly includes a camera body 100 and an imaging lens 200. In the camera body 100, a reference numeral 101 denotes an image sensor such as a CCD or CMOS sensor including an infrared cut filter, a low-pass filter, and the like, and an optical image of a subject is formed on a light receiving surface of the image sensor 101 by the imaging lens 200. The image sensor 101 photoelectrically converts the optical image of the subject, and an image based on the obtained electric signal is displayed as a live view image or recorded as a captured image. The electric signal obtained from the image sensor 101 is also used for detecting flicker. In the image sensor 101, the charge accumulation period can be controlled according to the shutter speed set as the image capturing setting information.

A reference numeral 102 denotes a shutter, and the exposure period of the image sensor 101 can be controlled by opening the shutter for a predetermined time at the time of image capturing.

A display unit 103 is composed of, for example, a TFT liquid crystal panel or the like. At the time of framing, an image acquired by the image sensor 101 and various image capturing setting information are displayed in real time to realize a live view. In addition, the captured image can be displayed and confirmed by the user according to the user's operation. Further, a touch panel may be provided on the display unit 103 and used as an operation member, and the touch panel detects a user's touch operation on an icon or the like displayed on the display unit 103, thereby the user can operate the functions associated with the displayed content on the display unit 103 at the touch position.

A CPU 104 controls each part of the camera body 100. The CPU 104 also controls the image sensor 101 and the display unit 103. Further, the CPU 104 performs calculation related to flicker detection based on the image taken by the image sensor 101. In the calculation related to the flicker detection, the frequency of a flicker light source, the peak timing of a light amount of flicker, and the like, are obtained.

Next, the imaging lens 200 will be explained.

A reference numeral 201 denotes a lens group including a focus lens, and the focus state can be adjusted by driving the focus lens. Although the lens group 201 is represented by one lens in FIG. 1, it is actually composed of a plurality of lenses. A reference numeral 202 denotes a diaphragm, which adjusts an amount of light to be passed into the camera. A reference numeral 203 represents a CPU that controls each part of the imaging lens 200. In addition to controlling the lens group 201 and the diaphragm 202, the CPU 203 communicates with the CPU 104 in the camera body 100 to provide information such as the focus position and an aperture to the camera body 100.

Figure 2A:
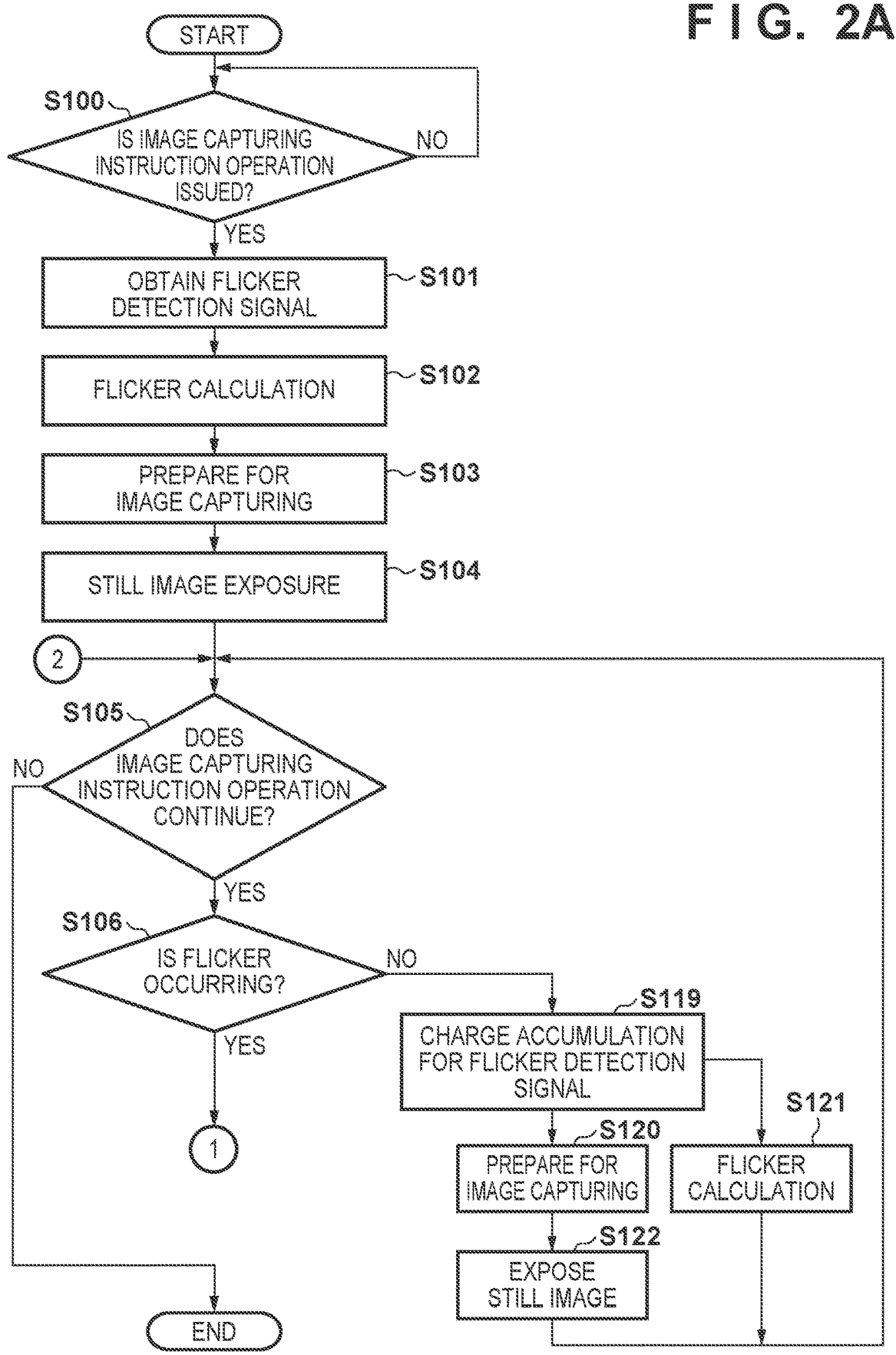
FIGS. 2A and 2B show a flowchart of image capturing processing according to a first embodiment.
Figure 2B:
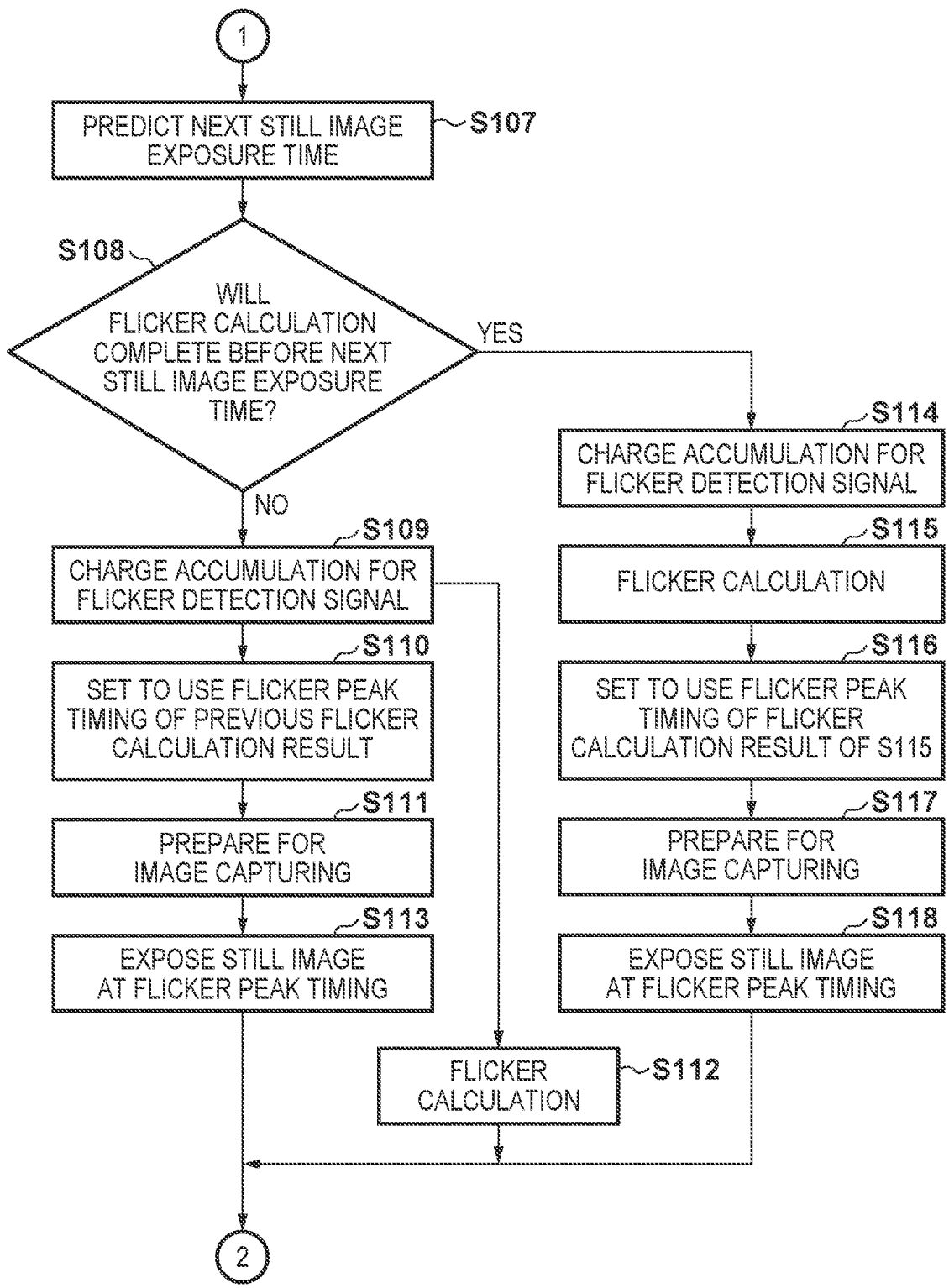

Next, image capturing processing in the first embodiment will be described with reference to FIGS. 2A and 2B. In the following description, since known techniques can be used for acquiring a signal for detecting flicker (hereinafter referred to as "flicker detection signal") and for calculating flicker from the flicker detection signal, the description thereof will be omitted.

First, in step S100, when a user performs an image capturing instruction operation such as pressing a shutter release button in the state where the power of the camera body 100 is on, the process proceeds to step S101.

In step S101, the CPU 104 uses the image sensor 101 to accumulate charge for flicker detection, and obtains a flicker detection signal.

Next, in step S102, the CPU 104 performs a flicker calculation for detecting flicker information using the flicker detection signal obtained in step S101. In the flicker calculation, whether or not flicker is occurring is determined, and if flicker is occurring, the frequency of the flicker and the peak timing of the flicker are detected.

In step S103, the CPU 104 sets the image quality parameter for a still image exposure to the image sensor 101. Further, if the flicker is detected in step S102, the CPU 104 determines the time to perform the still image exposure (referred to as "still image exposure time" hereinafter) so as to perform the still image exposure at the timing corresponding to the peak timing of the flicker. On the other hand, if flicker is not detected in step S102, it is not necessary to consider the peak timing of flicker, so the timing of the still image exposure is controlled so that the delay time from when the image capturing instruction is issued to when image capturing is started is as short as possible.

In step S104, the CPU 104 controls the image sensor 101 and the shutter 102 so that the still image exposure is performed at the timing determined in step S103. In the still image exposure performed at the timing corresponding to the peak timing of flicker in a case where the flicker is detected, the image sensor 101 may be controlled by an electronic shutter with the shutter 102 being kept open.

In step S105, the CPU 104 confirms whether the image capturing instruction operation by the user continues. If the image capturing instruction operation continues, the process proceeds to step S106. If the image capturing operation does not continue, the image capturing processing is ended.

In step S106, the CPU 104 determines whether or not flicker is occurring from the result of the previous flicker calculation, the process proceeds to step S107 if flicker is occurring, and proceeds to step S119 if flicker is not occurring.

If flicker is occurring, the CPU 104 predicts the next still image exposure time in step S107. The prediction of the next still image exposure time is performed based on the frequency of the continuous image capturing, in consideration of the length of an accumulation period for a live view image output between continuous still image exposures, the total period of the period for driving the diaphragm 202 in order to optimize the next still image capturing and so on, the peak timing of the flicker, and the previous still image exposure period. That is, the next still image exposure time is the time after an integer multiple of the flicker period since the previous still image exposure time.

Further, since the still image exposure time also changes depending on the image capturing settings by the user, the next still image exposure time is predicted in consideration of the user's image capturing settings. Examples of the user's image capturing settings include flash setting for controlling brightness and image quality setting of the still image that changes a readout period of a still image. These settings cause changes in the preparation for image capturing and in the processing after still image exposure, and therefore, the interval between still image exposures changes.

In step S108, the CPU 104 determines whether or not the flicker calculation can be completed by the next still image exposure time predicted in step S107 (predetermined condition). If it is determined that the flicker calculation cannot be completed, the process proceeds to step S109, and if it is determined that the flicker calculation can be completed, the process proceeds to step S114.

Here, the processes performed in step S109 and subsequent steps in a case where it is determined that the flicker calculation cannot be completed will be described with reference to the timing chart shown in FIG. 3A.

In step S109, the CPU 104 accumulates charge for the flicker detection signal in the same manner as in step S101 after performing an Nth still image exposure (N is a natural number) and accumulating change for a live view image. At this time, the CPU 104 controls to accumulate charge for the flicker detection signal so that the accumulation ends before the next still image exposure time and the accumulation starts at a timing close to the still image exposure timing with securing an image capturing preparation period. By controlling the accumulation timing for the flicker detection signal in this way, the interval between the accumulation time of the flicker detection signal and the still image exposure time can be shortened, so that the exposure non-uniformity of the still image due to the fluctuation of the flicker light source can be further reduced.

Figure 3A:
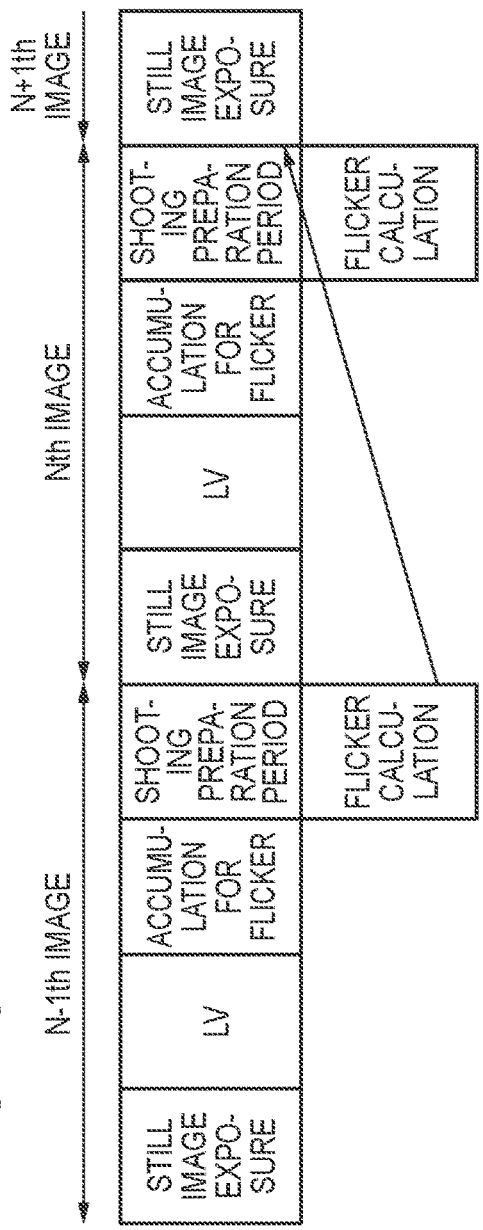
FIGS. 3A and 3B are timing charts showing the start time of still image capturing and timing of applying a flicker calculation result according to the first embodiment.

In the timing chart shown in FIG. 3A, an example is shown in which the charge accumulation for the flicker detection signal is performed after the charge accumulation of the live view image is completed. However, if it is possible to control, independently for each row of pixels of the image sensor 101, accumulation and readout of charges in the same period, it may be controlled such that charge for the flicker detection signal is accumulated during the charge for the live view image is accumulated. As a result, the waiting time until the charge accumulation for the flicker detection signal is completed can be shortened, so that the preparation for image capturing can be proceeded quickly.

Further, charge accumulation for the live view image may not be performed and a captured still image may be displayed on the display unit 103 instead of the live view image. This can eliminate the charge accumulation for the live view image, so that preparations for image capturing can be proceeded quickly.

In step S110, the CPU 104 sets the flicker peak timing, which is the flicker calculation result (N−1th information) performed after the N−1th still image exposure, to be used for calculating the still image exposure time of the N+1th still image.

In step S111, the CPU 104 uses the flicker peak timing set in step S110 to prepare for the N+1th still image exposure as in step S103.

In step S112, the CPU 104 performs flicker calculation using the flicker detection signal obtained in step S109 as in step S102. Here, the CPU 104 performs the image capturing preparation in step S111 and the flicker calculation in step S112 in parallel. This is because the parameters for the next still image exposure is set before the start of the next still image exposure in order to perform the next still image exposure on time at the continuous image capturing frequency. In FIG. 3A, it is assumed that the flicker calculation is completed before the start of the next still image exposure, however, if it is not completed, the flicker calculation may be continued even during the next still image exposure.

In step S113, the CPU 104 controls the image sensor 101 and the shutter 102 so that the still image exposure is performed at the timing corresponding to the flicker peak timing as in step S104.

By the above-described processing, if the flicker calculation is not completed before the next still image exposure time, the image capturing preparation for the next still image exposure can be performed based on the flicker calculation result obtained in the previous frame so that the frequency of the continuous image capturing can be increased. Further, since charge accumulation for the flicker detection signal and the flicker calculation are performed during the still image exposure, the frequency of the continuous image capturing can be stabilized.

Figure 3B:
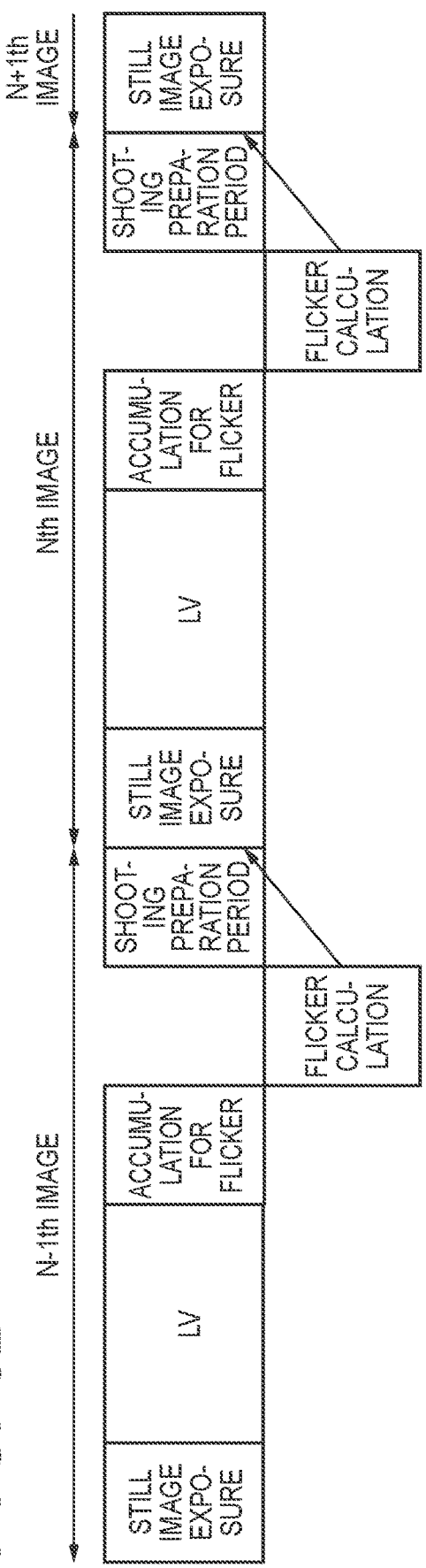

Next, the processes performed in step S114 and subsequent steps in a case where it is determined in step S108 that the flicker calculation will be completed will be described with reference to the timing chart shown in FIG. 3B.

In step S114, the CPU 104 controls to perform charge accumulation for the flicker detection signal in the same manner as in step S101 after performing the Nth still image exposure and the charge accumulation for the live view image. At this time, if the brightness of the external light is low, the accumulation period for the live view image may be lengthened in order to obtain an image for display on the display unit 103 or for obtaining an evaluation value for focusing on the subject. The CPU 104 controls to perform charge accumulation for the flicker detection signal at a timing close to a still image exposure after securing an image capturing preparation period so that the next still image exposure can be performed in time.

In step S115, flicker calculation is performed based on the flicker detection signal obtained by the charge accumulation in step S114. In the following step S116, the CPU 104 sets the flicker peak timing, which is the flicker calculation result (Nth information) in step S115, to be used for calculating the N+1th still image exposure time.

In step S117, the CPU 104 performs image capturing preparation for the N+1th still image as in step S103.

In step S118, the CPU 104 controls the image sensor 101 and the shutter 102 so that a still image exposure is performed at the timing corresponding to the flicker peak timing as in step S104.

Lastly, a case where it is determined in step S106 that flicker is not occurring will be described. Even if it is determined that flicker is not occurring based on the previous flicker calculation, flicker may occur during image capturing due to a change in the image capturing angle of view. Therefore, even if it is determined that flicker is not occurring, it is beneficial to acquire the flicker detection signal and perform flicker calculation.

In order to perform the next still image exposure in accordance with the flicker peak timing, the CPU 104 controls to perform charge accumulation for the flicker detection signal in step S119, and the CPU 104 performs the flicker calculation in step S121. If flicker is detected here, it becomes YES in step S106 when performing the next still image exposure, and the above-described processes of step S107 and subsequent steps will be performed.

In parallel with the flicker calculation in step S121, in step S120, the CPU 104 prepares for still image capturing in the same manner as in step S103. Since flicker is not detected here, the still image exposure time is determined so that a still image exposure is performed without considering the flicker peak timing.

In step S122, the CPU 104 controls the image sensor 101 and the shutter 102 to perform a still image exposure.

In steps S120 and S122, the flicker detection result is not reflected in the still image exposure, but the flicker detection result when the flicker was detected in the past may be used so as to perform a still image exposure at the flicker peak timing at that time.

As described above, according to the first embodiment, which flicker calculation result is used to calculate the next still image exposure time can be dynamically selected based on whether the flicker calculation will be completed before the next still image exposure time. With this selection, exposure nonuniformity can be suppressed without slowing down the frequency of the continuous image capturing.

In the above embodiment, charge accumulation for the flicker detection signal and flicker calculation are performed between still image exposures, however the disclosure is not limited to this. For example, a valid period of the flicker calculation result may be set, and control may be made so that charge accumulation for the flicker detection signal and the flicker calculation are not performed within the valid period.

Second Embodiment

Figure 4A:
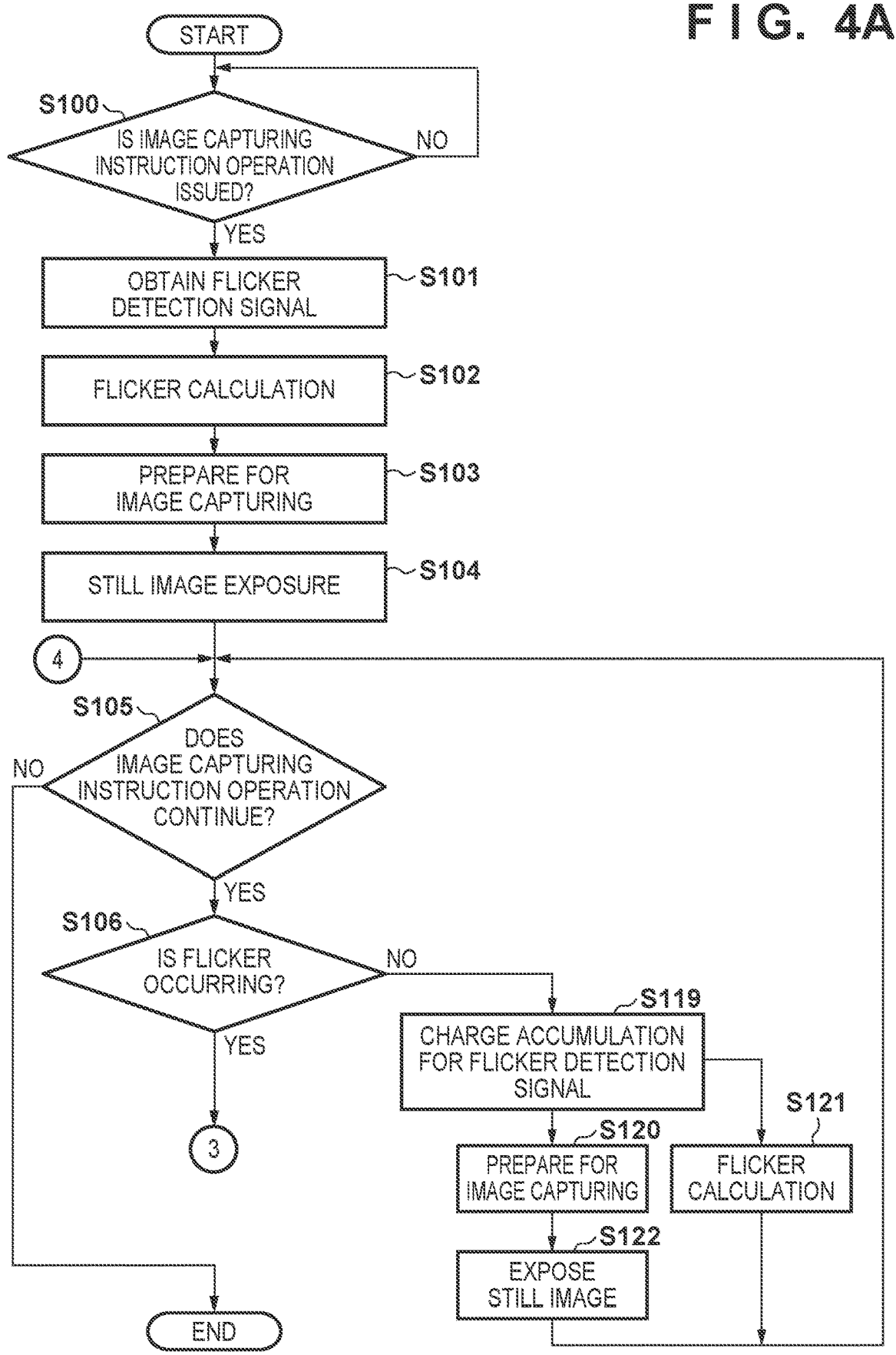
FIGS. 4A and 4B show a flowchart of image capturing processing according to a second embodiment.
Figure 4B:
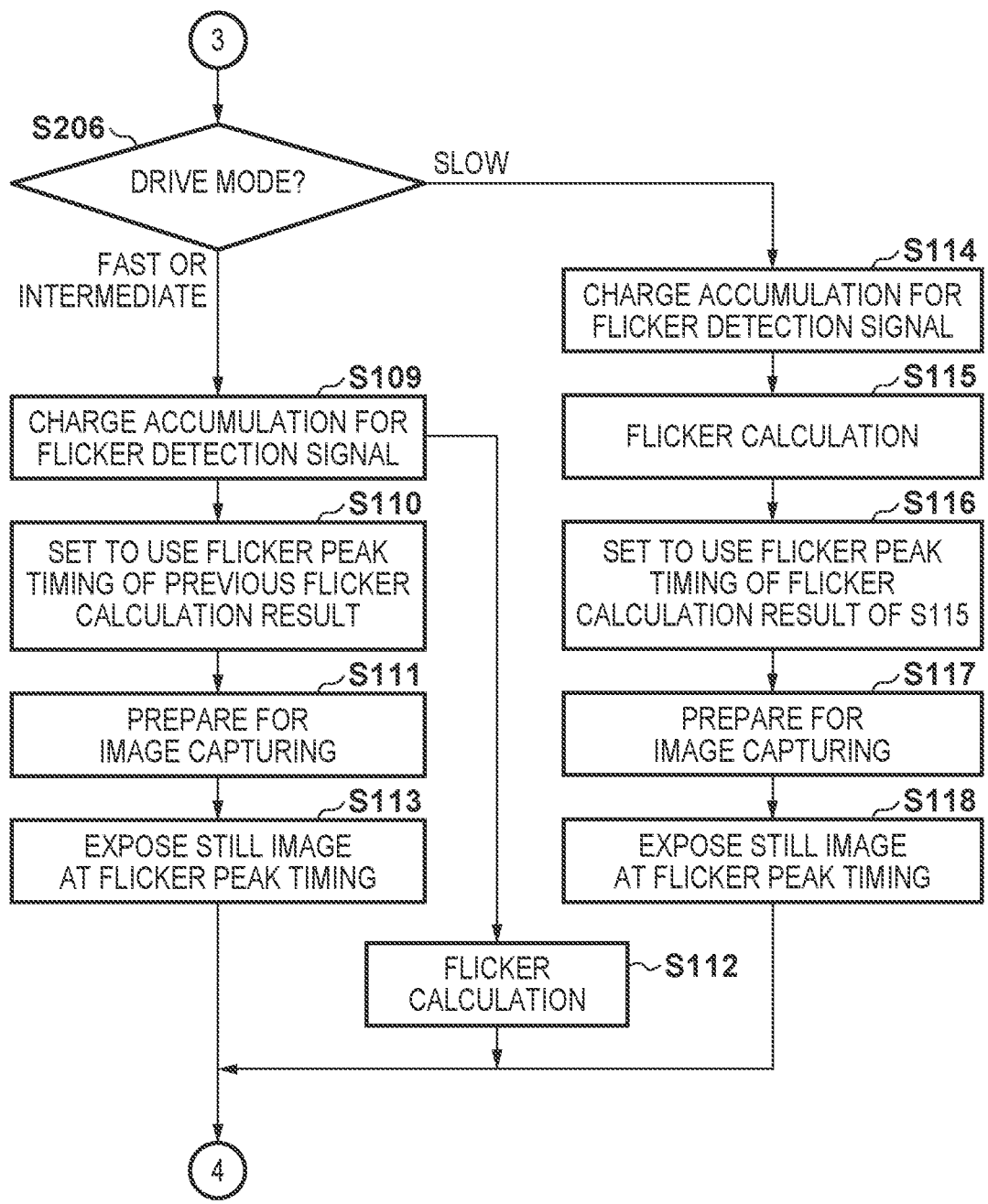

Next, a second embodiment of the disclosure will be described. A sequence in which continuous image capturing is performed at the flicker peak timing in the second embodiment will be described with reference to a flowchart shown in FIGS. 4A and 4B. Note that the same step numbers are assigned to the same processes as those in the flowchart of FIGS. 2A and 2B described above, and the description thereof will be omitted.

The difference between the second embodiment and the first embodiment is that it is determined in step S206 that which of the calculation results of the flicker calculation obtained at different timings is used for which of still image exposures based on a drive mode (predetermined condition). As an example, in a case where there are fast, intermediate, and slow drive modes, it is assumed that 30 frames/sec., 15 frames/sec. and 3 frames/sec. (image capturing frequency) are set to the drive modes, respectively. If the drive mode is determined to be the fast or intermediate drive mode in step S206, the CPU 104 performs the processes of steps S109 to S113.

Further, if the drive mode is the slow drive mode, the CPU 104 performs the processes of steps S114 to S118. If the drive mode is the slow drive mode, since the interval between still image exposures is long, it is possible to secure a sufficient period for charge accumulation for the flicker detection signal and flicker calculation. Therefore, the CPU 104 waits for completing the flicker calculation and controls to perform the next still image exposure at the flicker peak timing.

As described above, according to the second embodiment, by determining whether the calculation result of the flicker calculation can be used for the next still image exposure or for a still image exposure next to the next still image exposure according to the frequency of continuous image capturing, it is possible to easily select the processes to be performed.

In the second embodiment, the processes are selected according to the drive mode, but the processes may be selected by setting a threshold value and comparing the frequency of continuous image capturing (frequency of image capturing) with the threshold value (predetermined condition). For example, if the frequency of continuous image capturing is lower than the threshold value, the calculation result of the flicker calculation may be used in the next still image exposure, and if the frequency of continuous image capturing is equal to or higher than the threshold value, the calculation result of the flicker calculation may be used in a still image exposure next to the next still image exposure.

Further, in the first and second embodiments described above, the control during continuous image capturing of still images has been described, but it may be applied to the control of moving image capturing. In that case, the control may be performed by replacing the frequency of continuous image capturing with a frame rate, and the exposure of the image of each frame of the moving image corresponds to each still image exposure.

Other Embodiments

The aspect of the embodiments may be applied to a system composed of a plurality of devices (for example, a host computer, an interface device, a scanner, a video camera, etc.) or a device composed of one device.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-076560, filed Apr. 28, 2021 which is hereby incorporated by reference herein in its entirety.

What is claimed is:

1. An apparatus comprising:
   at least one processor; and
   a memory coupled to the at least one processor, the memory having instructions that, when executed by the processor, performs operations as:
   a sensor that captures an image;
   a controller that controls the sensor so as to obtain images by repeatedly capturing an image of a subject, and to output a detection signal for detecting flicker during a period since capturing of an Nth image (N is a natural number) is performed to capturing of an N+1th image is performed;
   a calculation unit that calculates information relating to flicker based on the detection signal;
   a selector that selects Nth information calculated based on the detection signal output during the period since the capturing of the Nth image is performed to the capturing of the N+1th image is performed or N−1th information calculated immediately before the Nth information according to a predetermined condition relating to a period required for performing calculation based on the detection signal; and
   a determination unit that determines a capturing timing of the N+1th image based on the Nth information or the selected N−1th information.

2. The apparatus according to claim 1, wherein the predetermined condition includes information about whether calculation of the Nth information will be completed before the capturing timing of the N+1th image is determined, and
   the selector selects the Nth information if the calculation of the Nth information is completed and selects the N−1th information if the calculation of the Nth information is not completed.

3. The apparatus according to claim 2, wherein the Nth information and the N−1th information each includes information about occurrence/absence of flicker, a frequency of flicker, and information relating to a change in light amount of the flicker.

4. The apparatus according to claim 2, wherein the at least one processor further operates as a prediction unit that, in a case where the N−1th information indicates occurrence of flicker, predicts a capturing timing of the N+1th image based on a sum of at least an accumulation period for the Nth image, an accumulation period for the detection signal, and a period required for preparing for capturing of the N+1th image, and a frequency and a change in light amount of flicker obtained from the N−1th information, and
   the selector performs the selection based on the predicted capturing timing of the N+1th image.

5. The apparatus according to claim 3, wherein, in a case where the N−1th information indicates occurrence of flicker, the determination unit determines the capturing timing of the N+1th image so as to correspond to a peak timing of the light amount of the flicker.

6. The apparatus according to claim 5, wherein, in a case where the N−1th information indicates occurrence of flicker, the determination unit determines, as the capturing timing of the N+1th image, a timing after a period which is longer than a sum of at least an accumulation period for the Nth image, an accumulation period for the detection signal, and a period required for preparing for capturing of the N+1th image, and which is closest to an integer multiple of a frequency of the flicker since the capturing timing of the Nth image.

7. The apparatus according to claim 1, wherein the predetermined condition includes information relating to frequency of capturing the images by repeatedly capturing an image the subject, and
   the selector selects the Nth information in a case where the frequency of capturing the images is a first frequency, and selects the N−1th information in a case where the frequency of capturing the images is a second frequency which is higher than the first frequency.

8. The apparatus according to claim 7, wherein the Nth information and the N−1th information each includes information about occurrence/absence of flicker, a frequency of flicker, and information relating to a change in light amount of the flicker.

9. The apparatus according to claim 8, wherein in a case where the N−1th information indicates occurrence of flicker, the determination unit determines the capturing timing of the N+1th image so as to correspond to a peak timing of the light amount of the flicker.

10. The apparatus according to claim 1, wherein the predetermined condition incudes information relating to frequency of capturing the images by repeatedly capturing an image of the subject, and the selector selects the Nth information in a case where the frequency is lower than a predetermined threshold, and selects the N−1th information in a case where the frequency is equal to or higher than the predetermined threshold.

11. The apparatus according to claim 10, wherein the Nth information and the N−1th information each includes information regarding occurrence/absence of flicker, a frequency of flicker, and information relating to a change in light amount of the flicker.

12. The apparatus according to claim 11, wherein, in a case where the N−1th information indicates occurrence of flicker, the determination unit determines the capturing timing of the N+1th image so as to correspond to a peak timing of the light amount of the flicker.

13. The apparatus according to claim 12, wherein, in a case where the N−1th information indicates occurrence of flicker, the determination unit determines, as the capturing timing of the N+1th image, a timing after a period which is longer than a sum of at least an accumulation period for the Nth image, an accumulation period for the detection signal, and a period required for preparing for capturing of the N+1th image, and which is closest to integer multiples of the frequency of capturing the images and a frequency of the flicker since the capturing timing of the Nth image.

14. The apparatus according to claim 1, wherein the at least one processor further operates as a setting unit that sets a valid period of the information, and
if the valid period has not elapsed since the calculation unit calculated the information last time, the sensor does not output the detection signal and the determination unit determines to use the information calculated last time.

15. The apparatus according to claim 1, wherein each of the images is a still image.

16. The apparatus according to claim 1, wherein each of the images is an image of each frame of a moving image.

17. A method for controlling an apparatus comprising:
controlling a sensor so as to obtain images by repeatedly capturing an image of a subject, and to output a detection signal for detecting flicker during a period since capturing of an Nth image (N is a natural number) is performed to capturing of an N+1th image is performed;
calculating information relating to flicker based on the detection signal;
selecting Nth information calculated based on the detection signal output during the period since the capturing of the Nth image is performed to the capturing of the N+1th image is performed or N−1th information calculated immediately before the Nth information according to a predetermined condition relating to a period required for performing calculation based on the detection signal; and
determining a capturing timing of the N+1th image based on the selected one of the Nth information or the N−1th information.

18. The method according to claim 17,
wherein the predetermined condition includes information about whether calculation of the Nth information will be completed before the capturing timing of the N+1th image is determined, and
wherein the selecting selects the Nth information if the calculation of the Nth information is completed and selects the N−1th information if the calculation of the Nth information is not completed.

19. A non-transitory computer-readable storage medium, the storage medium storing a program that is executable by the computer, wherein the program includes program code for causing the computer to operate as an apparatus having a sensor that captures an image comprising:
a controller that controls the sensor so as to obtain images by repeatedly capturing an image of a subject, and to output a detection signal for detecting flicker during a period since capturing of an Nth image (N is a natural number) is performed to capturing of an N+1th image is performed;
a calculation unit that calculates information relating to flicker based on the detection signal;
a selector that selects Nth information calculated based on the detection signal output during the period since the capturing of the Nth image is performed to the capturing of the N+1th image is performed or N−1th information calculated immediately before the Nth information according to a predetermined condition relating to a period required for performing calculation based on the detection signal; and
a determination unit that determines a capturing timing of the N+1th image based on the Nth information or the selected N−1th information.

20. The non-transitory computer-readable storage medium according to claim 19,
wherein the predetermined condition includes information about whether calculation of the Nth information will be completed before the capturing timing of the N+1th image is determined, and
wherein the selector selects the Nth information if the calculation of the Nth information is completed and selects the N−1th information if the calculation of the Nth information is not completed.

* * * * *